United States Patent
Takeda

[11] Patent Number: 5,876,658
[45] Date of Patent: Mar. 2, 1999

[54] METHOD FOR FORMING ELECTRODE USING HEATING AND PRESSURIZING OF A RESIN MATERIAL AND THE ELECTRODE THUS FORMED

[75] Inventor: Toshikazu Takeda, Fujisawa, Japan

[73] Assignee: Isuzu Motors Limited, Tokyo, Japan

[21] Appl. No.: 623,106

[22] Filed: Mar. 28, 1996

[30] Foreign Application Priority Data

Mar. 30, 1995 [JP] Japan .................................. 7-074099
Jun. 27, 1995 [JP] Japan .................................. 7-161300

[51] Int. Cl.[6] .................................................. B29P 22/00
[52] U.S. Cl. .......................... 264/618; 264/614; 264/620; 264/625; 264/463; 427/81; 427/226; 427/385.5; 427/407.1; 204/192.17
[58] Field of Search .............................. 423/447.1, 447.6; 427/79, 126.3, 162, 380, 385.5, 81, 229, 282, 287, 226, 419.5, 407.1; 204/192.1, 192.7, 192.5, 192.17, 192.14; 264/459, 463, 614, 618, 620, 625, 477

[56] References Cited

U.S. PATENT DOCUMENTS

| 3,615,829 | 10/1971 | Sprague . |
| 4,609,972 | 9/1986 | Edeling et al. .................... 361/433 |
| 5,172,307 | 12/1992 | Tabuchi et al. .................... 361/502 |
| 5,254,360 | 10/1993 | Crownover et al. ................ 427/79 |

OTHER PUBLICATIONS

Patent Abstracts of Japan, vol. 16, No. 548 (C–1005), Nov. 18, 1992 & JP 04 209713 A (Mitsui Petrochem Ind Ltd), Jul. 31, 1992 (abstract).

*Primary Examiner*—Merrick Dixon
*Attorney, Agent, or Firm*—Staas & Halsey

[57] ABSTRACT

An electrode for an electric double layer capacitor in which resin is used as a starting material and the manufacturing cost is low and a method of manufacturing the same are disclosed. A method of manufacturing an electrode for an electric double layer capacitor containing carbonized resin includes heating resin at a temperature equal to or higher than the temperature for finishing endothermic reaction of the resin upon melting (softening to be fluidized) of the resin and equal to or lower than the temperature for starting oxidizing reaction in an atmosphere of a pressure range of 0.01 to 10 kg/cm2, cooling the temporarily baked resin to a normal temperature and powdering it, and manufacturing a molded carbon by heating the powdered resin at a temperature equal to or higher than the temperature for starting the oxidizing reaction of the resin after pressure molding or heating the powdered resin at a temperature equal to or higher than the temperature for starting the oxidizing reaction while pressurizing the temporarily baked powder resin. The electrode contains 10% or less of the ratio of the pores each having a pore size of 20 Angstrom or more to the entire surface area of the pores of the electrode.

8 Claims, 11 Drawing Sheets

Fig. 4

| BAKING TEMPERATURE (°C) | EMBODIMENT 1 | EMBODIMENT 2 | EMBODIMENT 3 | COMPARISON EXAMPLE |
|---|---|---|---|---|
| 700 | 23 F/g | 30 F/g | -- | 23 F/g |
| 850 | 25 F/g | 42 F/g | 47 F/g | 25 F/g |

FIG. 7

| | ENTIRE SURFACE AREA (m²/g) | SURFACE AREA OF PORES EACH HAVING PORE SIZE OF 20Å (m²/g) | ENTIRE SURFACE AREA OF PORES EACH HAVING PORE SIZE OF 20Å (%) | ELECTROSTATIC CAPACITY (F/cm³) |
|---|---|---|---|---|
| EMBODIMENT 3 APPLIED PRESSURE 3kg/cm² | 761 | 15 | 2 | 75 |
| EMBODIMENT 3 NO PRESSURE | 702 | 37 | 5 | 55 |
| ACTIVATED CARBON A SOLD IN MARKET | 2516 | 671 | 26 | 28 |
| ACTIVATED CARBON B SOLD IN MARKET | 2240 | 295 | 13 | 31 |
| ACTIVATED CARBON C SOLD IN MARKET | 3235 | 1135 | 35 | 28 |
| ACTIVATED CARBON D SOLD IN MARKET | 1694 | 164 | 10 | 33 |
| ACTIVATED CARBON E SOLD IN MARKET | 2263 | 398 | 17 | 32 |
| ACTIVATED CARBON F SOLD IN MARKET | 1543 | 428 | 27 | 20 |

…

METHOD FOR FORMING ELECTRODE USING HEATING AND PRESSURIZING OF A RESIN MATERIAL AND THE ELECTRODE THUS FORMED

BACKGROUND OF THE INVENTION

1. (Field of the Invention)

This invention relates to an electrode for an electric double layer capacitor and a method of manufacturing the same and, more particularly, to an electrode for an electric double layer capacitor optimum for obtaining a large electrostatic capacity and a method of manufacturing the same.

2. (Description of the Prior Art)

Recently, an electric double layer capacitor using the storage of charge based on an electric double layer, i.e., a principle of an electric double layer has been developed and manufactured. Since this capacitor can obtain a large electrostatic capacity, the small-sized capacitor has been used for a back-up power source of a semiconductor memory for an electronic equipment and the large-sized capacitor has been used for the part of the utilization of an on-vehicle lead battery.

A method of manufacturing a molded unit of activated carbon comprising the first step of pressurizing carbon powder mixed with water under pressure of 50 kg/cm2 while heating the carbon powder to obtain powder activated carbon, and the second step of pressure molding the resultant powder activated carbon under the pressure of 50 to 800 kg/cm2 at a temperature of 700° to 1,000° C. to obtain the molded unit of the activated carbon as an electrode material for the electric double layer capacitor of this type was disclosed in Japanese Patent Application Laid Open No. 3-201,520(1991) by the same assignee as the present invention.

As a result of the research and development of an electrode for an electric double layer capacitor, the applicant of the present invention has also developed an electrode material in which pores are formed by heating polyvinylidene chloride resin in a non-oxidizing atmosphere and thereby generating atomic and molecular defects, and filed Patent Application Laid Open No. 7-24955 (1994). This material showed in the above Laid Open document is formed of a porous carbon material having very fine pores, which is an electrode material of much higher capacity than that of the conventional activated carbon.

Since the carbon powder is used as a starting material in the molding method disclosed in the above-described Japanese Patent Application Laid Open No. 3-201520 (1991), its volatile component which contributes to its solidification has been evaporated in the step of carbonizing, and hence difficult to be solidified. Thus, in the case of molding, large power or large energy is required. Hence, its manufacturing cost is high. Further, this method also has a problem of difficulty of increasing the molding density. In order to solidify the carbon powder, when binder is used, its electric capacity is reduced that much of the binder in the case of manufacturing the capacitor. When the resin of the material of the carbon is pulverized as it is, then molded and thereafter sintered, its volatile component is excessively much, and hence its shape cannot be maintained. Because the volatile component is evaporated in a large quantity at the time of baking, and its shape is collapsed by its evaporative power.

In other words, according to the conventional method, the volatile component is excessively much or little and not suitable, and hence the carbon powder cannot be sufficiently solidified.

SUMMARY OF THE INVENTION

This invention contemplates solving the above-described subject, and thus, an object of this invention is to provide a method of manufacturing an electrode for an electric double layer capacitor in which manufacturing cost are reduced and which comprises the steps of manufacturing temporarily baked resin by heating resin as a starting material in an atmosphere of a pressure range of 0.01 to 10 kg/cm2 at a temperature equal to or higher than the melting point of the resin or a temperature equal to or higher than the temperature for finishing an endothermic reaction of the resin upon melting (softening to be fluidized) of the resin and equal to or lower than the temperature for starting an oxidizing reaction, manufacturing the temporarily baked powder resin by cooling the temporarily baked resin to a normal temperature and then cooling the baked resin, and manufacturing to obtain molded carbon by pressure molding the temporarily baked powder resin, then heating the powder resin at a temperature equal to or higher than the temperature for starting the oxidizing reaction of the resin or heating the temporarily baked powder resin at a temperature equal to or higher than the temperature for starting the oxidizing reaction while pressurizing the temporarily baked powder resin, thereby obtaining the molded carbon.

Further, this invention also provides an electrode for an electric double layer capacitor comprising carbonized resin, wherein the ratio of pores each having a pore size of 20 Angstrom or more and occupying the entire surface area of the pores of the electrode is 10% or less.

According to this invention as described above, the resin material is heated and temporarily baked in the atmosphere of the pressure range of 0.01 to 10 kg/cm2 at the temperature equal to or higher than the melting point of the resin or equal to or higher than the temperature for finishing the endothermic reaction upon melting (softening to be fluidized) of the resin and equal to or lower the the temperature for starting the oxidizing reaction, thereby baking the resin material in the state that the volatile component of a suitable quantity in the material remains. Therefore, the molded electrode can be manufactured without using binder, and the capacitor having larger capacity can be provided.

BRIEF DESCRIPTION OF THE DRAWINGS

FIG. 4 is a view showing data obtained by experimenting electric performance of the porous carbon molded unit of the embodiments of this invention.

FIG. 7 is a view showing the ratio of the surface area of the pores each having a pore size of 20 Angstrom or more to the entire surface area of seven types of activated carbons A to G sold in the market at the applied pressure of the first heating step of no pressure and the pressure of 3.0 kg/cm2 of the porous carbon molded unit and the electrostatic capacity of embodiment 3 of this invention

DESCRIPTION OF THE PREFERRED EMBODIMENTS

The inventors of this invention have aimed at, devising a method of manufacturing an optimum porous carbon molded unit used as an electrode for an electric double layer capacitor. Its mass change is caused by the evaporation of the volatile component in the resin. The characteristics of the mass change and reaction heat at the time of heating was sealed by using powderlike polyvinylidene chloride resin (PVDC) adapted to manufacture the porous carbon. The relationship between the heating temperature at the time of heating and the evaporation amount of the volatile component, were grasped. The heating temperature in which the volatile component effective for molding remains was obtained.

Figure 10:
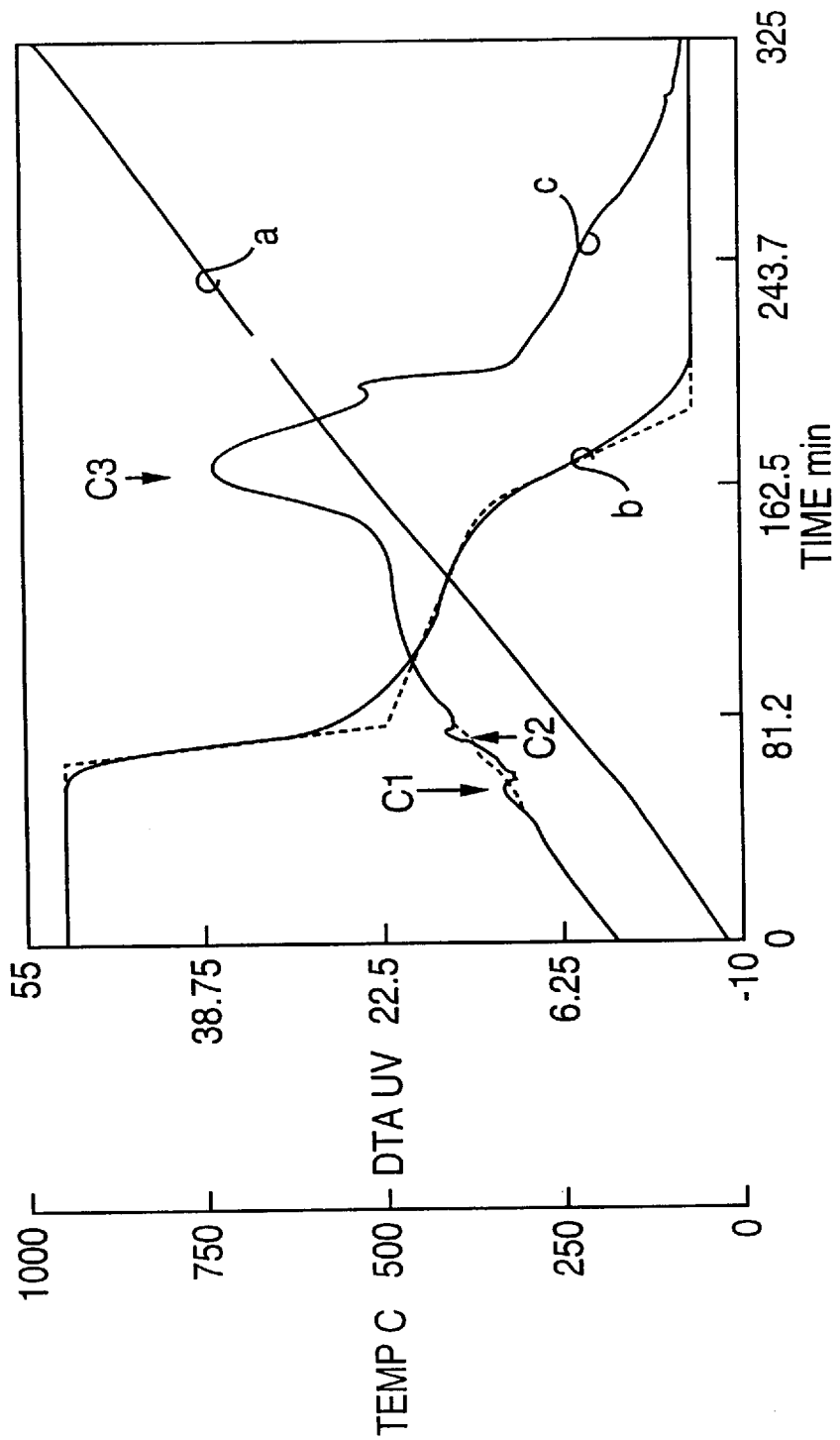
FIG. 10 is a graph showing the experimental results of the mass change and the reaction heat of the resin by heating in the atmosphere.
Figure 11:
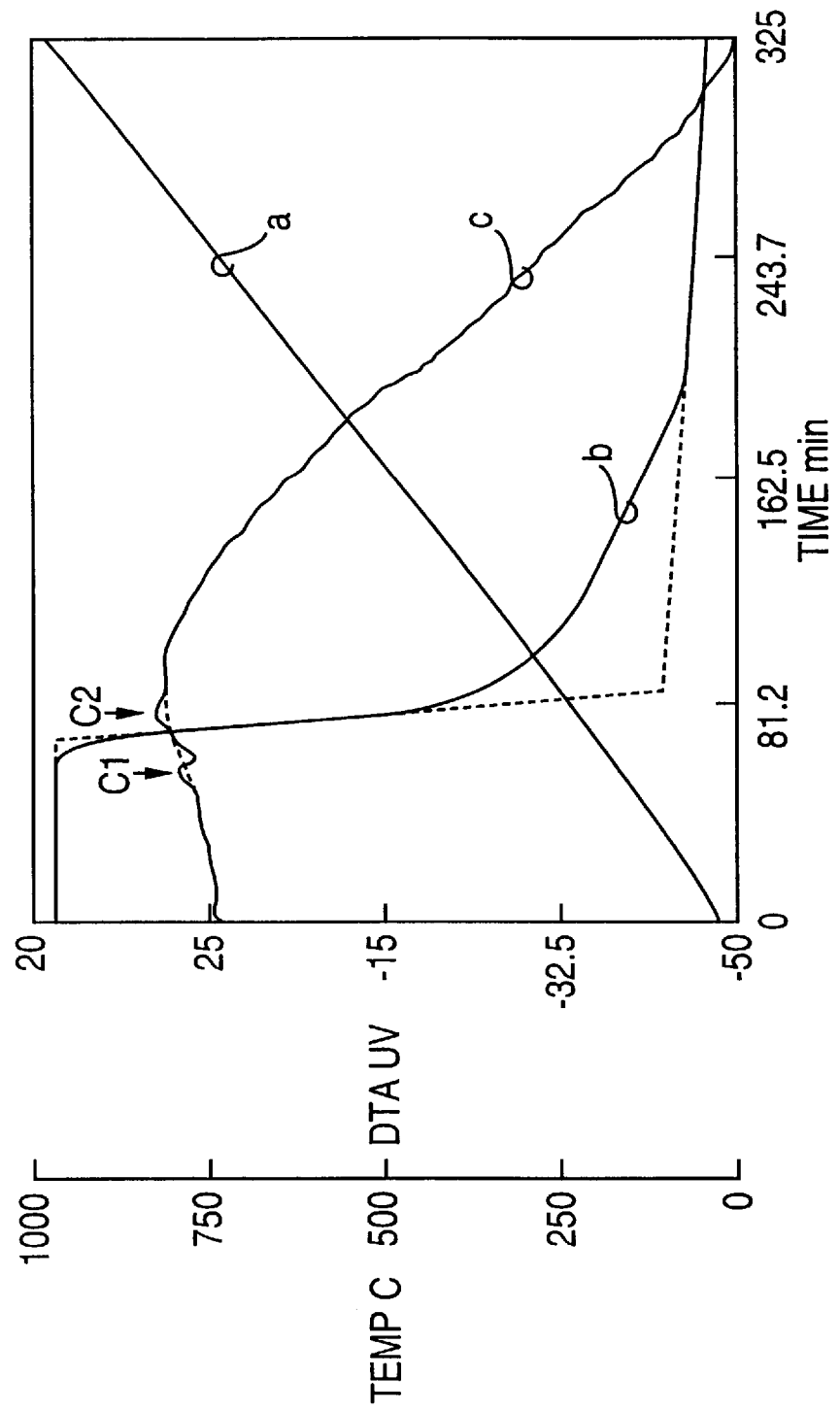
FIG. 11 is a graph showing the experimental results of the mass change and the reaction heat of the resin by heating in nitrogen gas.

FIGS. 10 and 11 are graphs showing the results, wherein abscissa axes indicate the heating time and ordinate axes indicate the mass and the temperature. FIG. 10 shows the characteristics of the case that the PVDC is heated in an oxidizing atmosphere (the atmosphere), and FIG. 11 shows the characteristics of the case that the PVDC is heated in an non-oxidizing atmosphere (nitrogen gas). The curves a in FIGS. 10 and 11 are the heating temperature of a heating furnace to rise in proportion to a time base, and the mass change (curve b) and reaction heat characteristics (curve c) at that time are shown.

When the reaction heat (curve c) of FIG. 10 is aimed at in the case that the resin material is heated in the oxidizing atmosphere (atmosphere), the reaction heat is reduced at a point c1. This is caused by the endothermic reaction of the melting of the resin. This point is the melting point of the resin. It has been understood that no mass change occurs at this point, i.e., the volatile component in the resin is not almost evaporated. This endothermic reaction is finished at a point c2, and it has been understood that the mass reduction has abruptly occurred (the evaporation of the volatile component in the resin) at this point. In this respect of the PVDC experimented this time, the melting point is 175° C., and the finishing point of the endothermic reaction of the resin due to the melting was 230° C.

Since the same phenomenon occurs at the points c1 and c2 in FIGS. 10 and 11 in the case that the resin is heated in the non-oxidizing atmosphere, the reactions at the points c1 and c2 are oxidation, i.e., not the reaction together with burning.

When the heating of the resin is further advanced, in the case that the resin is heated in the oxidizing atmosphere (atmosphere), the curve c of FIG. 10 is abruptly raised in its reaction heat at a point c3, but in the case that the resin is heated in the non-oxidizing atmosphere, it has been understood that this phenomenon does not occur. From these facts, it has been understood that the point c3 of the curve c of the case that the resin is heated in the oxidizing atmosphere (atmosphere) is caused by the reaction due to oxidation. In the case of the PVDC, the point c3 of the curve c was 530° C.

To manufacture the molded unit from the analyzed result described above, when the resin is heated at a temperature equal to or higher than the point c1 or c2 and equal to or lower than the point c3, it has been understood that the material in which the volatile component which contributes to the molding remains can be obtained.

Figure 1:
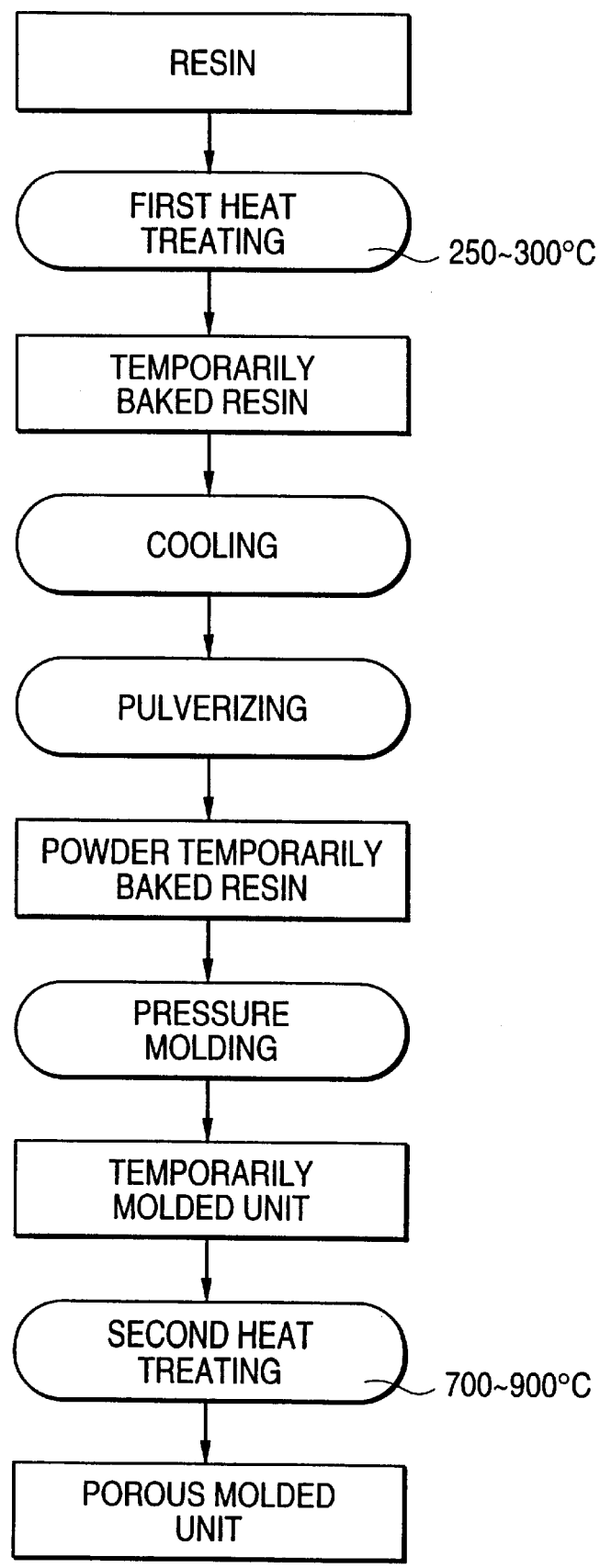
FIG. 1 is a view showing the steps of manufacturing a porous carbon molded unit of an embodiment 1 of this invention.

As an embodiment 1 of this invention, an electrode for an electric double layer capacitor is manufactured by a method of manufacturing shown in FIG. 1 based on the knowledge described above, and the performance of the capacitor has been measured.

Figure 9:
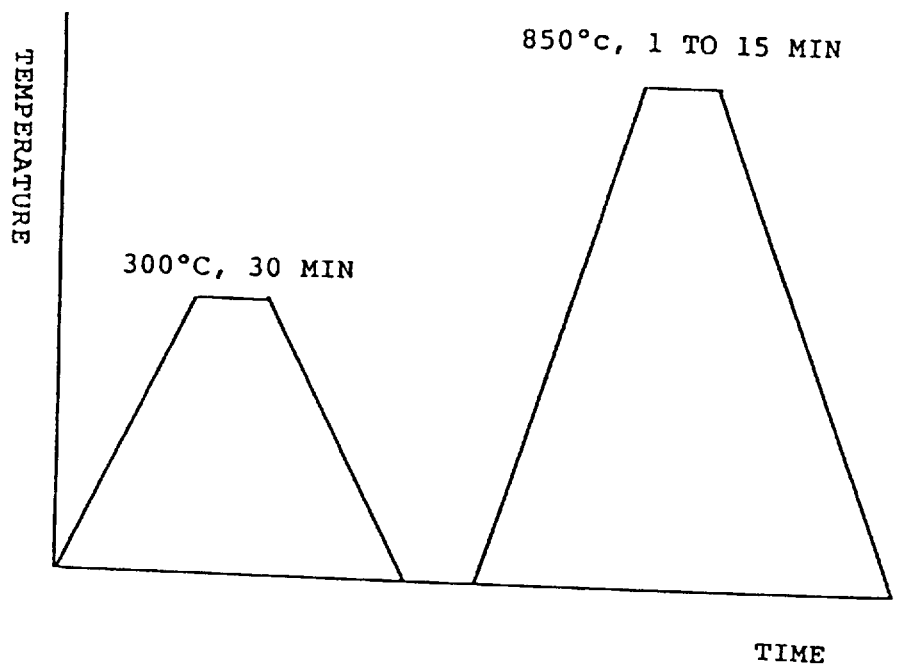
FIG. 9 is a view showing the temperature pattern of the manufacturing steps of the porous carbon molded unit of the embodiments of this invention.

FIG. 1 shows a flow chart and will not be described. Resin, PVDC, as a raw material is first heated at 250° to 300° C. of the temperature equal to or higher than the above-described melting point (point c1) or the temperature or higher of endothermic reaction finishing point (point c2 in FIG. 10) by melting and equal to or lower than the oxidizing reaction point (point c3 of FIG. 10) for 30 minutes to obtain temporarily baked resin. Then, the temporarily baked resin is cooled to a normal temperature, and pulverized to obtain powder temporarily baked resin. The powder resin is boiled in water. This boiling step is not mandatory, but is effective for the performance of the resultant capacitor. Then, the powder temporarily baked resin is temporarily pressure molded, heated to be baked at 700° and 850° C. of the temperature equal to or higher than the oxidizing reaction point (point c3 of FIG. 10) to obtain two types of porous carbon molded units. The pattern of the temperature of this manufacturing method is shown in FIG. 9. In FIG. 9, the holding time of the baking temperature is preferably 1 to 15 minutes, but it may be one hour or less.

Figure 2:
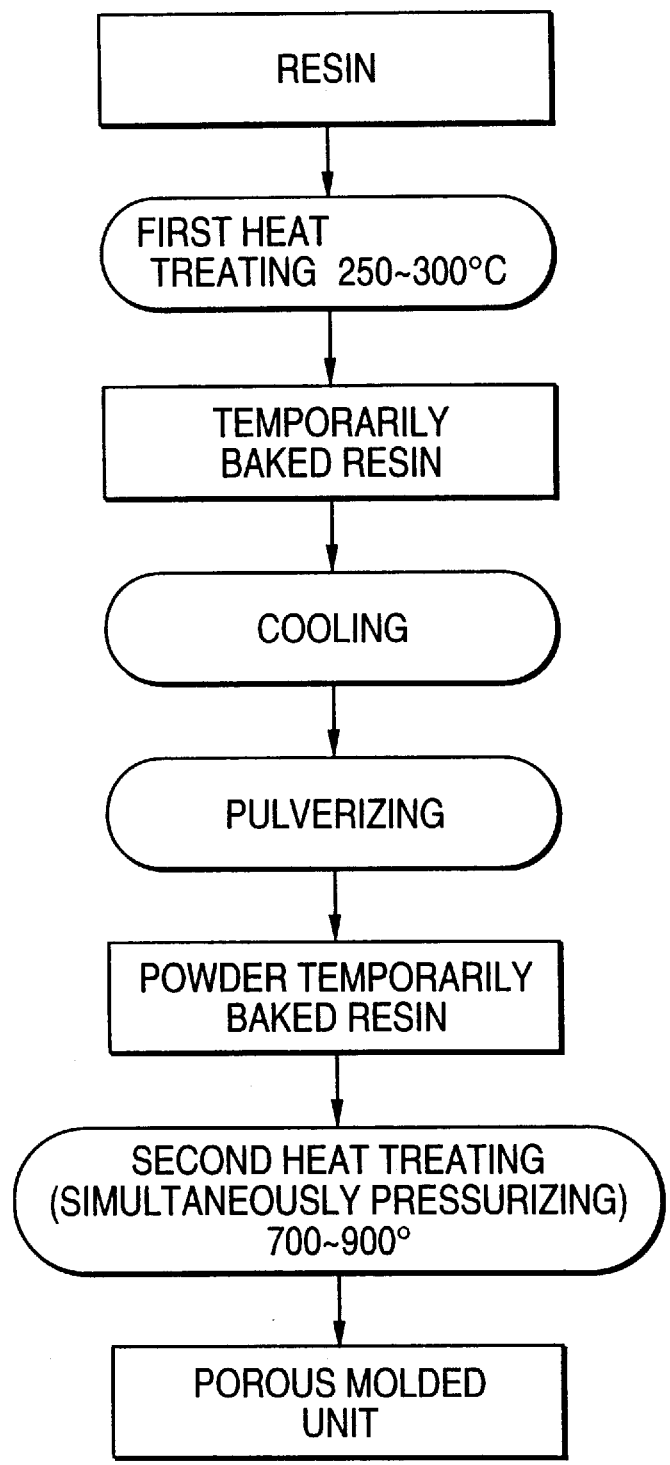
FIG. 2 is a view showing the steps of manufacturing a porous carbon molded unit of an embodiment 2 of this invention.

As an embodiment 2 of this invention, as shown in FIG. 2 illustrating a flow chart, except the steps of pressurizing and heating to bake the resin without temporarily pressure molding the resin of the embodiment 1 (in FIG. 1), porous carbon molded unit is obtained similarly to the steps of the embodiment 1, an electrode for an electric double layer capacitor is manufactured, and the performance of the resultant capacitor was measured.

Figure 3:
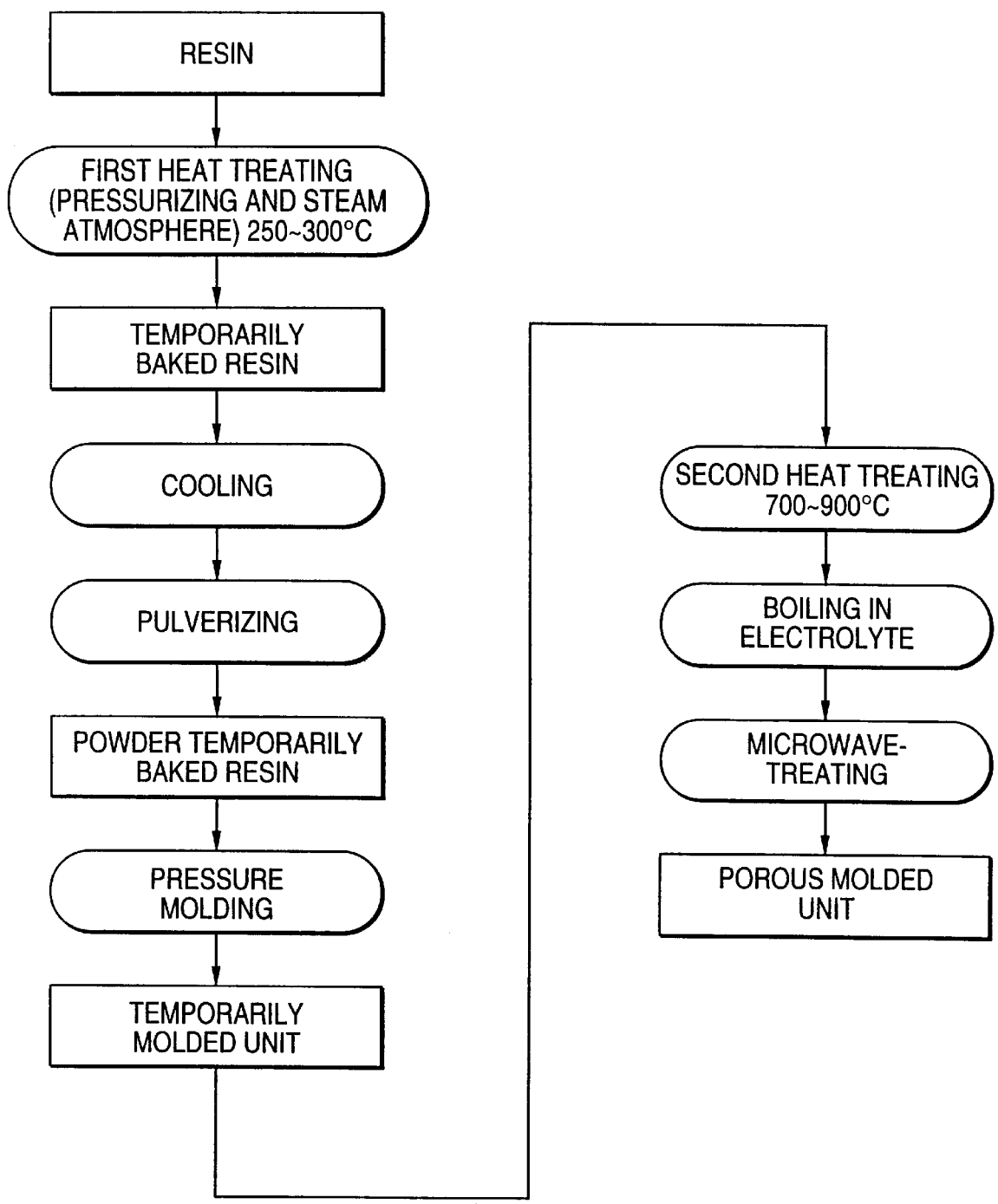
FIG. 3 is a view showing the steps of manufacturing a porous carbon molded unit of an embodiment 3 of this invention.

As an embodiment 3 of this invention, as shown in FIG. 3 illustrating a flow chart, except the steps of first heating the resin to obtain the temporarily baked resin of the embodiment 1 (in FIG. 1) in a steam atmosphere, applying a pressure to the resin in a range of no pressure to 20 kg/cm2 at the time of heating the resin, second heating the resin, then boiling electrolyte to impregnate the resin with the electrolyte, and microwave treating the resin, porous carbon molded unit is obtained similarly to the steps of embodiment 1, an electrode for an electric double layer capacitor is manufactured, and the distribution of pore sizes and the performance of the resultant capacitor were measured.

In comparison, PVDC which was carbonized at 700° to 900° C. in a non-oxidizing atmosphere is mixed with binder (Teflon resin) and molded to obtain a porous carbon molded unit, and the performance of the resultant capacitor is similarly measured. Further, the distributions of pore sizes and the performance of the capacitors of sizes types of activated carbon (indicated by symbols A to F) sold in the market were measured.

The experimental results of the electric capacities of the electric double layer capacitors of these electrodes are shown in FIG. 4. In FIG. 4, the results of embodiment 3 are obtained from the case that the pressure at the first heating time is no pressure and the electrostatic capacity is maximum at the pressure of 3.0 kg/cm2. From the results of FIG. 4, it is understood that embodiment 1 has the performance equivalent to that of the comparison example even when no binder is included and no pressure existed at the time of heating to bake the resin. It is also understood that the embodiment 2 obtains the electrostatic capacity of 1.3 to 1.6 times as large as the comparison example by pressurizing and heating to bake the resin and that the embodiment 3 obtains the increase in the capacity of about three times as large as the comparison example by pressurizing and temporarily baking the resin in the steam atmosphere and microwave-treating the resin after the resin is molded and baked.

Figure 5:
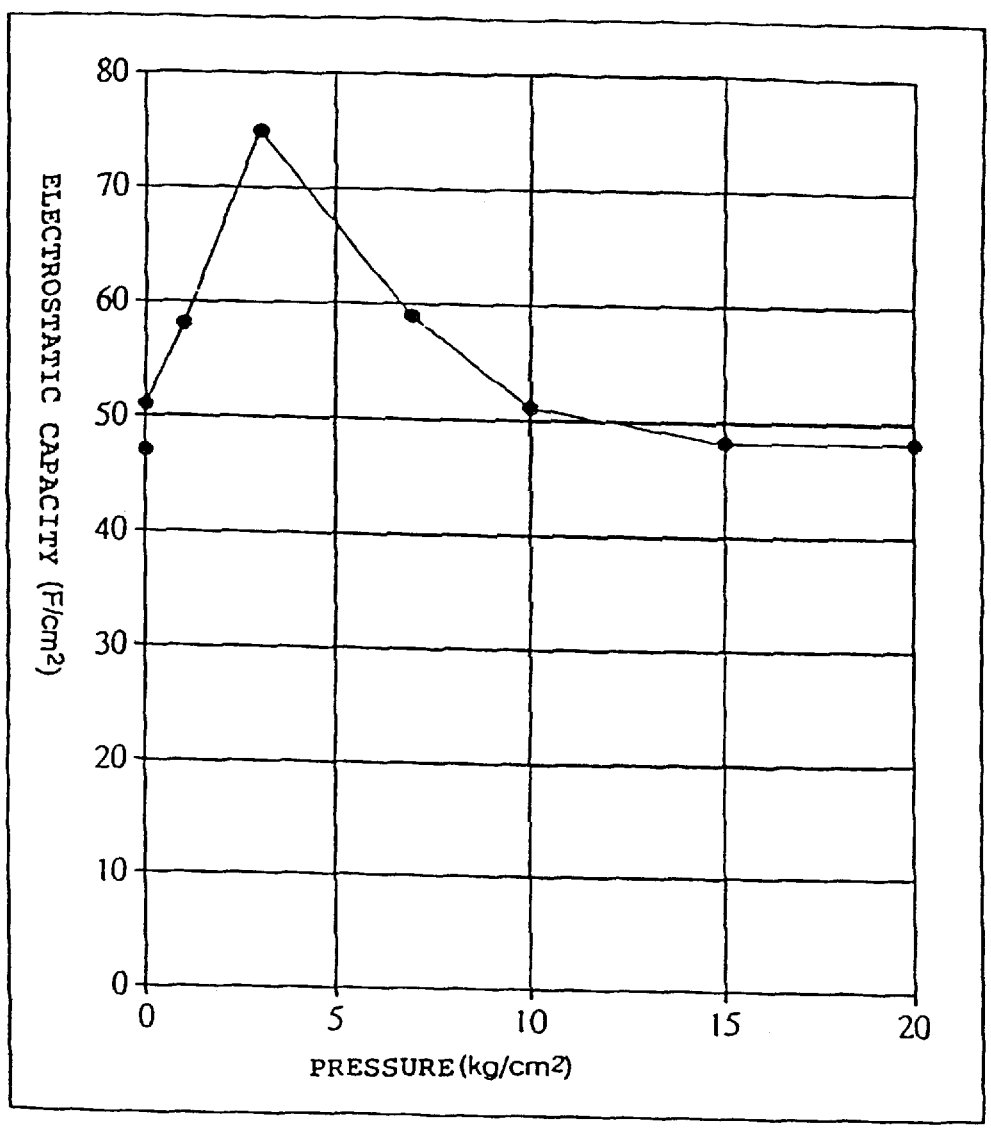
FIG. 5 is a view showing the electrostatic capacity of embodiment 3 of this invention when applied pressure of the first heating step of the porous carbon molded unit of embodiment 3 is varied.
Figure 6:
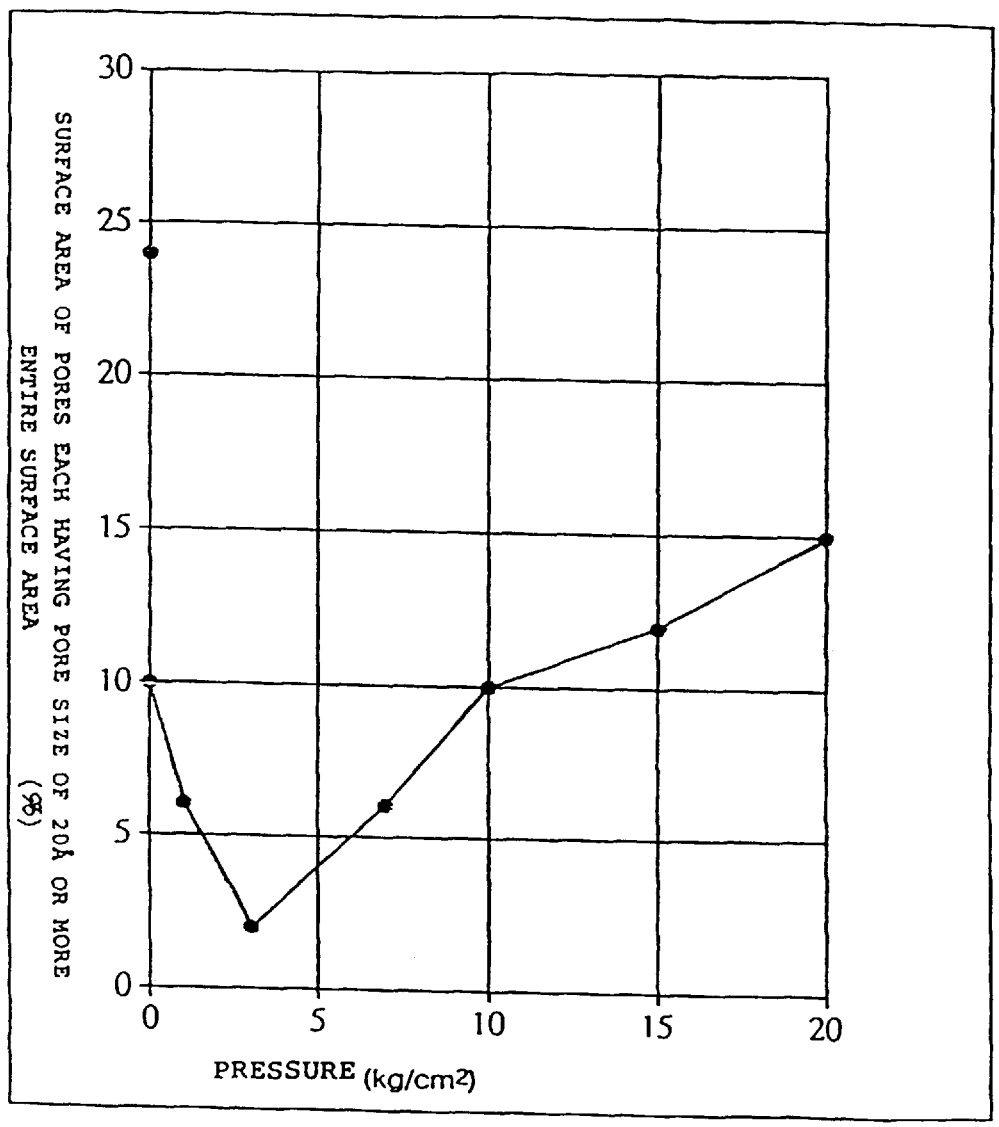
FIG. 6 is a view showing the ratio of the surface area of pores each having a pore size of 20 Angstrom or more to the surface area of the case that the applied pressure of the first heating step of the porous carbon molded unit of embodiment 3 of this invention is varied.

FIG. 5 shows the electrostatic capacity of embodiment 3 when the applied pressure of the first heating step is varied, and FIG. 6 is the ratio of the surface area of the pores each having a pore size of 20 Angstrom or more to the entire surface area of the pores in the case that the electrostatic capacity of the first heating step is varied.

From FIG. 5, it is understood that, when the applied pressure of the first heating step is varied, the electrostatic capacity exhibits maximum at the pressure of 3.0 kg/cm2, and the capacity is minimum at no pressure and the pressure of 10 kg/cm2 or more.

From FIG. 6, it is understood that, when the applied pressure of the first heating step is varied, the ratio of the surface area of the pores each having a pore size of 20 Angstrom or more to the entire surface area exhibits minimum at the pressure of 3.0 kg/cm2, and the ratio of the surface area of the pores each having a pore size of 20 Angstrom or more to the entire surface area is large at no pressure and the pressure of 10 kg/cm2 or more. The reason why the surface area of the pores each having a pore size of 20 Angstrom is noted, is because it is generally recognized to sort the pore sizes at 20 Angstrom as a boundary. For example, the classification of the pores of a macro pore: 500 Angstrom or more, a meso pore: 500 to 20 Angstrom, micro pore: 20 to 8 Angstrom and submicro pore: 8 Angstrom or less was determined according to IUPAC (International Union of Pore and Applied Chemistry) in 1972.

Figure 8:
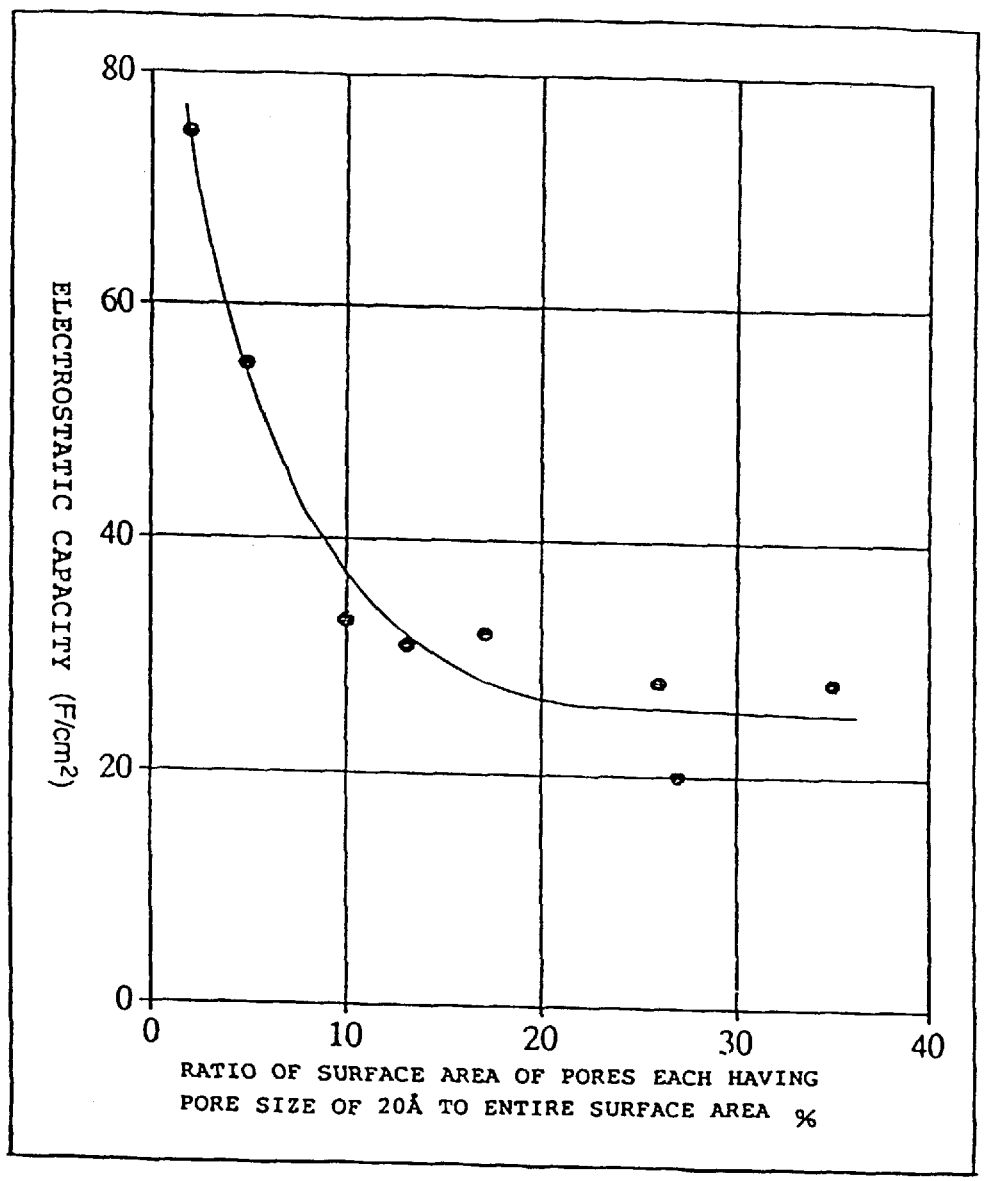
FIG. 8 is a graph showing data of FIG. 7.

FIG. 7 is a table showing the ratio of the surface area of the pores each having a pore size of 20 Angstrom or more to the entire surface areas of seven types of activated carbons A to G sold in the market at no pressure and the pressure of 3.0 kg/cm2 of the applied pressure of the first heating step and the electrostatic capacity of the above-described embodiment 3. FIG. 8 shows a graph illustrating the data of FIG. 7, wherein its abscissa axis indicates the ratio of the surface area of the pore each having a pore size of 20 Angstrom to the entire surface area and its ordinate axis indicates the electrostatic capacity. From these drawings, it is understood that, when the ratio of the surface area of the pores, each having a pore size of 20 Angstrom, to the entire surface area is 10% or less, the increase in the electrostatic capacity is remarkable.

According to this invention as described above, the resin material is heated and temporarily baked at a temperature equal to or higher than the melting point of the resin and equal to or lower than the temperature for starting the oxidizing reaction in the atmosphere of the pressure range of 0.01 to 10 kg/cm2, thereby baking the resin in the state that the suitable quantity of the volatile component in the material remains. Therefore, the molded electrode can be manufactured without using the binder, and the capacitor having larger capacity can be provided. When the electrode having high performance is required, the resin material is heated and temporarily baked at the temperature equal to or higher than the temperature for finishing the endothermic reaction upon melting (softening to be fluidized) of the resin and equal to or lower than the temperature for starting the oxidizing reaction in the atmosphere of the pressure range of 0.01 to 10 kg/cm2, and the temporarily baked resin is simultaneously pressurized and heated to be baked to be provided.

The reason why the first heating temperature is set to "the temperature or higher for finishing the endothermic reaction upon melting (softening to be fluidized) of the resin" is because, when the resin is heated at the temperature for finishing the melting of the resin, the pores in the carbon are collapsed, and hence no surface area is increased.

Further, the conventional electrode molded by using the binder has the problem of deteriorating the binder. However, the electrode according to this invention does not have such a problem. Further, the electrostatic capacity of the capacitor of this invention is further improved by heat treating the resin in the steam atmosphere in the temporarily heating step.

What we claim is:

1. A method of manufacturing an electrode for an electric double layer capacitor comprising:

heating resin as a raw material at a first heating temperature equal to or higher than the melting point of the resin and equal to or lower than a temperature for starting an oxidizing reaction of the resin thus forming a temporarily baked resin;

cooling the temporarily baked resin to a normal temperature and powdering the resin;

pressure molding the temporarily baked powered resin; and manufacturing a molded carbon by heating the resin at a second heating temperature equal to or higher than the temperature for starting the oxidizing reaction of said resin.

2. A method of manufacturing an electrode for an electric double layer capacitor according to claim 1, wherein said first heating temperature is equal to or higher than the temperature for finishing the endothermic reaction of the resin upon melting of the resin and equal to or lower than the temperature for starting the oxidizing reaction of the resin.

3. A method of manufacturing an electrode for an electric double layer capacitor according to claim 1 or 2, wherein said step of heating the resin includes using an atmosphere having a pressure range of 0.01 to 10 kg/cm2.

4. A method of manufacturing an electrode for an electric double layer capacitor according to claim 1, or claim 2 or claim 3, wherein said step of heating said resin is executed in a steam atmosphere.

5. A method of manufacturing an electrode for an electric double layer capacitor according to claim 1, wherein said resin material is polyvinylidene chloride resin.

6. A method of manufacturing an electrode for an electric double layer capacitor according to claim 1, wherein said first heating temperature is 200° to 500° C.

7. A method of manufacturing an electrode for an electric double layer capacitor according to claim 1, wherein said second heating temperature is 500° to 900° C.

8. A method of manufacturing an electrode according to claim 1, further comprising the step of choosing PVDC as the resin.

* * * * *